United States Patent
Haye et al.

(10) Patent No.: US 12,529,551 B2
(45) Date of Patent: Jan. 20, 2026

(54) AUTONOMOUS INSPECTION OF A SURFACE TOPOLOGY OF AN AIRFOIL OF A GAS TURBINE ENGINE

(71) Applicant: RTX Corporation, Farmington, CT (US)

(72) Inventors: Sheridon Haye, College Station, TX (US); Jeremiah Lee, Coventry, CT (US)

(73) Assignee: RTX CORPORATION, Farmington, CT (US)

( * ) Notice: Subject to any disclaimer, the term of this patent is extended or adjusted under 35 U.S.C. 154(b) by 52 days.

(21) Appl. No.: 18/592,181

(22) Filed: Feb. 29, 2024

(65) Prior Publication Data

US 2025/0277657 A1    Sep. 4, 2025

(51) Int. Cl.
G01B 7/34    (2006.01)
(52) U.S. Cl.
CPC ...................... G01B 7/34 (2013.01)
(58) Field of Classification Search
None
See application file for complete search history.

(56) References Cited

U.S. PATENT DOCUMENTS

| | | | |
|---|---|---|---|
| 5,191,791 A | 3/1993 | Gerardi et al. | |
| 7,653,235 B2 | 1/2010 | Mylaraswamy et al. | |
| 7,703,327 B2 | 4/2010 | Georgeson et al. | |
| 8,151,643 B2 | 4/2012 | De Smet | |
| 8,605,272 B2 | 12/2013 | Mercier et al. | |
| 9,255,909 B2 | 2/2016 | Kollgaard et al. | |
| 9,334,066 B2 | 5/2016 | Tapia et al. | |
| 10,048,064 B2 | 8/2018 | Munro et al. | |
| 10,468,545 B1 | 11/2019 | Yang | |
| 2011/0178727 A1 | 7/2011 | Hafenrichter et al. | |
| 2017/0052024 A1 | 2/2017 | Reece et al. | |
| 2021/0122478 A1 | 4/2021 | Mackin et al. | |

(Continued)

FOREIGN PATENT DOCUMENTS

CN    112896354 B    4/2022
JP    S55100104 U    7/1980

(Continued)

OTHER PUBLICATIONS

Extended European Search Report dated Jul. 9, 2025, for corresponding European Patent Application No. 25160063.1, 4 pgs.

(Continued)

Primary Examiner — Guerrier Merant
(74) Attorney, Agent, or Firm — Kinney & Lange, P.A.

(57) ABSTRACT

Apparatus and associated methods relate to autonomous devices configured to inspect surface topologies of airfoils of a gas turbine engine. The autonomous device moves across the airfoil while remaining coupled thereto while sensing the surface topology of the airfoil using a plurality of topological sensors. Each of the plurality of topological sensors includes a piezoelectric sensor that generates an electrical signal indicative of a loading to the piezoelectric sensor, as well as an airfoil contacting member. The airfoil contacting member extends between the piezoelectric sensor and the airfoil when the body is coupled thereto. The airfoil contacting member provides changes to the loading to the piezoelectric sensor in response to changes in the surface topology of the airfoil as the body moves thereacross.

20 Claims, 7 Drawing Sheets

(56) References Cited

U.S. PATENT DOCUMENTS

| | | |
|---|---|---|
| 2021/0302248 A1 | 9/2021 | Alspach et al. |
| 2021/0302255 A1 | 9/2021 | Alspach et al. |
| 2023/0024295 A1 | 1/2023 | Godbole et al. |

FOREIGN PATENT DOCUMENTS

| | | |
|---|---|---|
| JP | S57110405 U | 7/1982 |
| WO | 2023158840 A1 | 8/2023 |

OTHER PUBLICATIONS

Bazaei, Ali, et al., Displacement Sensing by Piezoelectric Transducers in High-Speed Lateral Nanopositioning. IEEE Sensors Journal, 2019, 19 (20), pp. 9156-9165. 10.1109/jsen.2019.2923428. hal-03224105, submitted May 11, 2021.

Extended European Search Report for European Patent Application No. 25160085.4, dated Aug. 26, 2025, 9 pages.

AUTONOMOUS INSPECTION OF A SURFACE TOPOLOGY OF AN AIRFOIL OF A GAS TURBINE ENGINE

BACKGROUND

Gas turbine engines are used in many, if not most, commercial aircraft as the source of propulsion. Such engines have many and various sets of airfoils, which are used to perform various functions. Many of these airfoils are grouped into disks (or stages) of airfoils that rotate at high rotational rates about an axis of these gas turbine engines. For example, compressor blades are rotating airfoils that are principally used to compress air before air enters a combustion chamber. Turbine blades are rotating airfoils that extract mechanical energy from the expanding gases of the combustion process to turn other blades, such as, for example, compressor blades and fan blades. Turbofan engines are gas turbine engines equipped with fan blades, which are rotating airfoils that provide much, if not most, of the propulsion generated by such turbofan engines. Many gas turbine engines also have non-rotating blades that are group into stages of airfoils as well. Such non-rotating blades, called stator blades, are non-rotating airfoils that control rotational direction of the gases within gas turbine engines so as to prevent stalling of the rotating airfoils and to increase efficiency of the gas turbine engines. Such non-rotating stages are often interposed between rotating stages.

During operation of gas turbine engines, these various airfoils can be worn and or damaged. Ingesting dust, ash, or larger foreign objects can result in abrasion, pitting, or destruction of these airfoils. Because the integrity of these airfoils is important for safe and effective operation of gas turbine engines, routine inspections thereof are performed. Some such inspections involve an inspector utilizing a borescope to assist visualization of these engine parts. When possible, the inspector might even crawl into the engine to visually inspect the engine and/or to drag his/her finger across each blade, in an attempt to feel for any imperfections. Calibrating the accuracy of such manual inspections can be difficult. In some examples, inspections are performed by cameras, which involves taking high resolution imagery, which can supplement human visual evaluation by performing computational image processing so as to be able to detect tiny defects that might be present. Such inspections are typically only performed during scheduled maintenance operations, due to the time required and equipment needed for thorough inspection.

SUMMARY

Some embodiments relate to an autonomous device for inspecting surface topology of an airfoil of a gas turbine engine. The autonomous device includes a body, means for coupling the body to the airfoil in a manner that permits movement of the body across the airfoil while remaining coupled thereto, and means for moving the body across the airfoil while remaining coupled thereto. The autonomous device also includes a plurality of topological sensors extending from the body to the airfoil when the body is coupled thereto. Each of the plurality of topological sensors includes a piezoelectric sensor that generates an electrical signal indicative of a loading to the piezoelectric sensor. Each of the plurality of topological sensors also includes an airfoil contacting member extending between the piezoelectric sensor and the airfoil when the body is coupled thereto, thereby providing changes to the loading to the piezoelectric sensor in response to changes in the surface topology of the airfoil as the body moves thereacross. The autonomous device also includes a surface topology calculator attached to the body and electrically connected to the plurality of piezoelectric sensors and configured to locate defects in the surface topology of the airfoil based on the electrical signals generated by the plurality of piezoelectric sensors.

Some embodiments relate to a method for inspecting surface topology of an airfoil of a gas turbine engine. The method includes adhering a base of an autonomous device to the airfoil in a manner that permits movement of the body across the airfoil while remaining coupled thereto. The method continues by moving the base of the autonomous device across the airfoil while remaining coupled thereto. The method includes extending a plurality of topological sensors from the body to the airfoil when the body is coupled thereto. For each of the plurality of topological sensors, the method includes providing changes to a loading to a piezoelectric sensor in response to changes in the surface topology of the airfoil as the body moves thereacross. For each of the plurality of topological sensors, the method also includes generating, via the piezoelectric sensor, an electrical signal indicative of a loading to the piezoelectric sensor. The method includes locating, via a surface topology calculator, defects in the surface topology of the airfoil based on the electrical signals generated by the plurality of piezoelectric sensors.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Inspecting airfoils of gas turbine engines more frequently than is permitted by regularly scheduled maintenance sessions would increase safety and longevity of such gas turbine engines. Such frequent inspections could be performed if such inspections could be quickly and easily performed while an aircraft is parked at a gate of an airport, for example. Such quick and easy inspections could be made possible if performed by small devices that could autonomously navigate across an airfoil of a gas turbine engine and quickly survey such an airfoil. By deploying a swarm of such small autonomous devices, many airfoils could be simultaneously surveyed. By using algorithms that do not require powerful processing engines, such small autonomous devices could possess processors capable of performing such algorithmic operations.

Apparatus and associated methods described herein relate to such autonomous devices configured to inspect surface topologies of airfoils of a gas turbine engine. The autonomous device moves across the airfoil while remaining coupled thereto while sensing the surface topology of the airfoil using a plurality of topological sensors. Each of the plurality of topological sensors includes a piezoelectric sensor that generates an electrical signal indicative of a loading to the piezoelectric sensor, as well as an airfoil contacting member. The airfoil contacting member extends between the piezoelectric sensor and the airfoil when the body is coupled thereto. The airfoil contacting member provides changes to the loading to the piezoelectric sensor in response to changes in the surface topology of the airfoil as the body moves thereacross.

Figure 1:
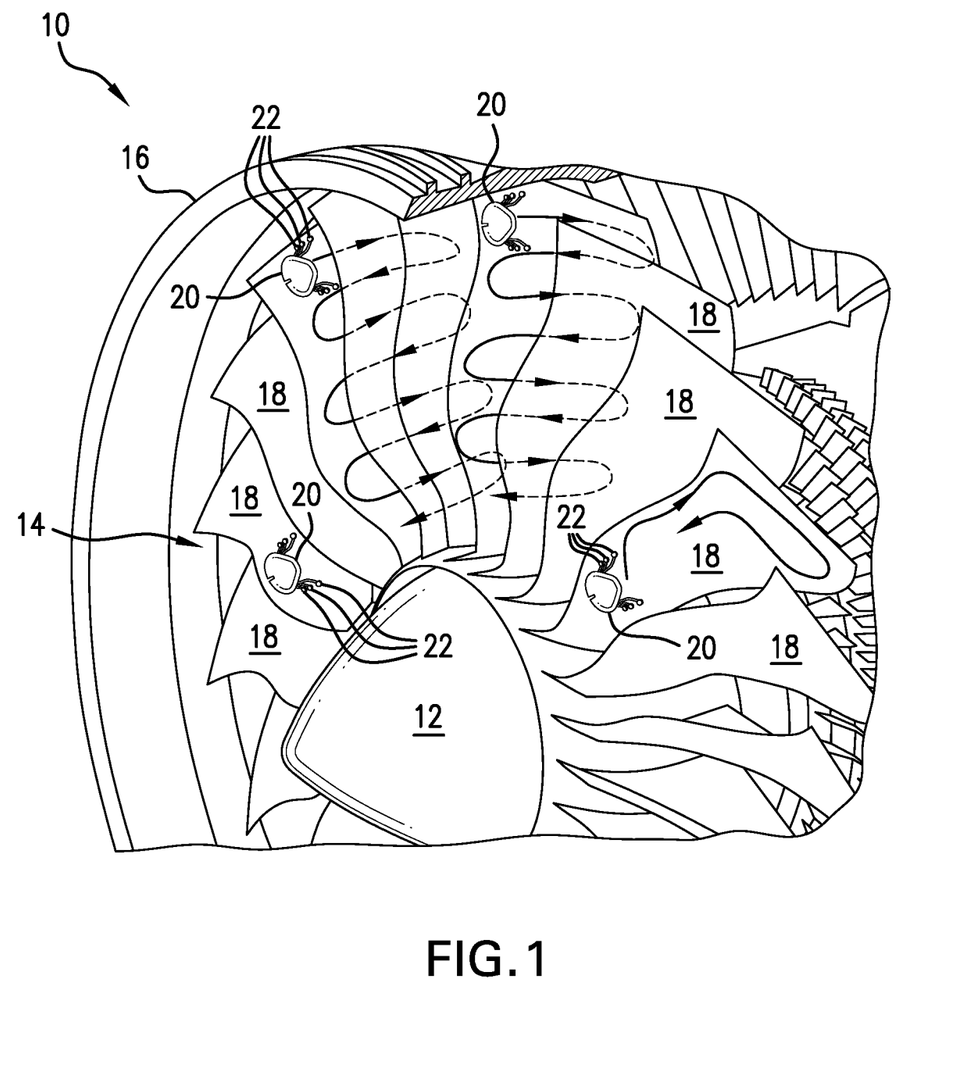
FIG. 1 is a perspective view of a swarm of autonomous devices inspecting surface topologies of fan blades of a gas turbofan engine.

FIG. 1 is a perspective view of a swarm of autonomous devices inspecting surface topologies of fan blades of a gas turbofan engine. In FIG. 1, gas turbofan engine 10 includes spinner 12, fan 14 and nacelle 16. Fan 14 includes a plurality of fan blades 18. Each of the swarm of autonomous devices 20 is coupled to a fan blade 18 in a manner that permits movement of autonomous device 20 across fan blade 18 while remaining coupled thereto. Autonomous devices 20 are configured to inspect surface topologies of the fan blades 18 to which autonomous devices 20 are coupled. To inspect the surface topologies, each autonomous device 20 has topological sensors that generate electrical signals indicative of the surface topology of fan blade 18 as autonomous device 20 traverses fan blade 18.

In the embodiment depicted in FIG. 1, each autonomous device 20 has legs 22 that move autonomous device 20 across fan blade 18. Legs 22 are configured to both couple autonomous device 20 to fan blade 18 and to move autonomous device 20 across fan blade 18. In some embodiments, legs 22 have suction cups that couple each autonomous device 20 to fan blade 18 using evacuated chambers with such suction cups. In other embodiments, legs 22 affix to fan blade 18 via an adhesive and/or via a contacting surface that couples using van der Waals forces. In the depicted embodiment, legs 22 can be articulated so as to push and/or pull autonomous device 20 across fan blade 18, and then be repositioned to a new location upon fan blades 18. Such alternative pushing/pulling and repositioning can be coordinated with coupling/uncoupling to fan blades 18. For example, miniature vacuum pumps (possibly manufactured by nano manufacturing techniques, using piezoelectric crystal vibrators, for example) can provide suction coupling of legs 22 to fan blade 18 while legs 22 are pushing and/or pulling autonomous device 20 across fan blade 18. Then, air can be provided to such suction cups to relieve suction while legs 22 are repositioned to new locations on fan blade 18. Such coordination of coupling and repositioning can be performed in a manner such that at least four of the six legs 22, as depicted in the FIG. 1 embodiment, are at all times providing coupling of autonomous device 20 to fan blade 18. Other means for moving autonomous device 20 across airfoil 18, such as fan blades 18, will be described below, with reference to FIGS. 3A and 3B.

Figure 2:
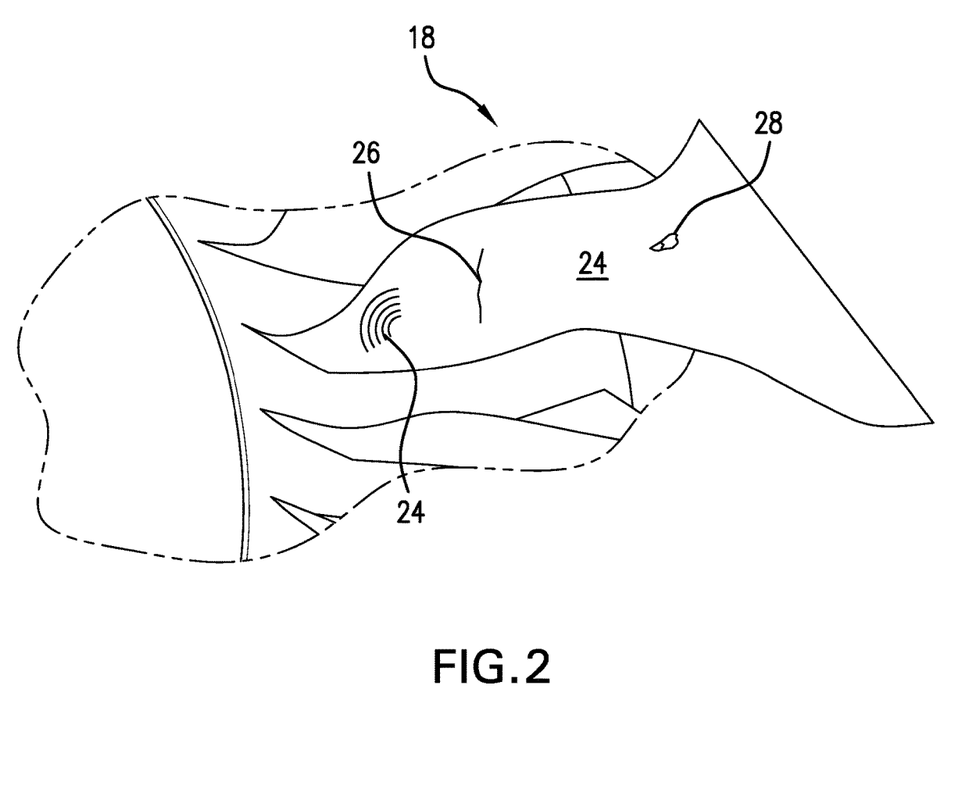
FIG. 2 is a close-up or magnified view of the surface topology of a damaged fan blade of a gas turbofan engine.

FIG. 2 is a close-up or magnified view of the surface topology of a damaged fan blade of a gas turbofan engine. In FIG. 2, a close-up or magnified view of surface 24 of airfoil 18 is shown. Such a close-up or magnified view depicts micro defects in surface 24 of airfoil 18. If not remedied, such micro defects (e.g., hairline scratches, surface cracks, etc.) can develop in time and lead to catastrophic damage to airfoil 18. Such remedies can include polishing surface 24, filling and polishing the damaged area(s), and or replacing airfoil 18. Such micro defects can be hard to see with the unaided eye. Moreover, inspection of a set of airfoils 18 can be time consuming if done by hand. Inspection of a set of airfoils 18 can be expeditiously performed, however, if done by a plurality of autonomous devices 20. Such expedience can result from simultaneous inspection of multiple airfoils 18.

To perform such an inspection of the surface topology of airfoil 18, these autonomous devices 20 should be sized appropriately-their lateral dimensions should be less that lateral dimensions of airfoil 18 at inspection locations, and their height (above airfoil 18) should be less than the space available between adjacent airfoils 18 at such inspection locations. These small autonomous devices 20 can then be deployed as a swarm, so as to quickly and autonomously inspect a plurality of airfoils 18. Their construction should also be light, consisting of relatively soft materials so that if lost, autonomous device 20 would pass through and disintegrate in the engine while it is in operation causing no damage to the engine. These small autonomous devices 20 should also be light so as to be able to maintain coupling with irregularly shaped airfoils 18. Without adequate coupling, such autonomous devices 20 could fall from airfoils 18 before inspection has been completed. Moreover, such falls could damage sensitive components of these small autonomous devices 20. Because these autonomous devices 20 are small, they can be equipped with only limited computing power. Thus, the algorithms used to inspect and/or map the surface topology should be such that they can be performed in-situ in real time using the computing power available to such small autonomous devices 20. The airfoil contacting members can be designed specifically to simplify the computational requirements for performing image analytics.

Figure 3A:
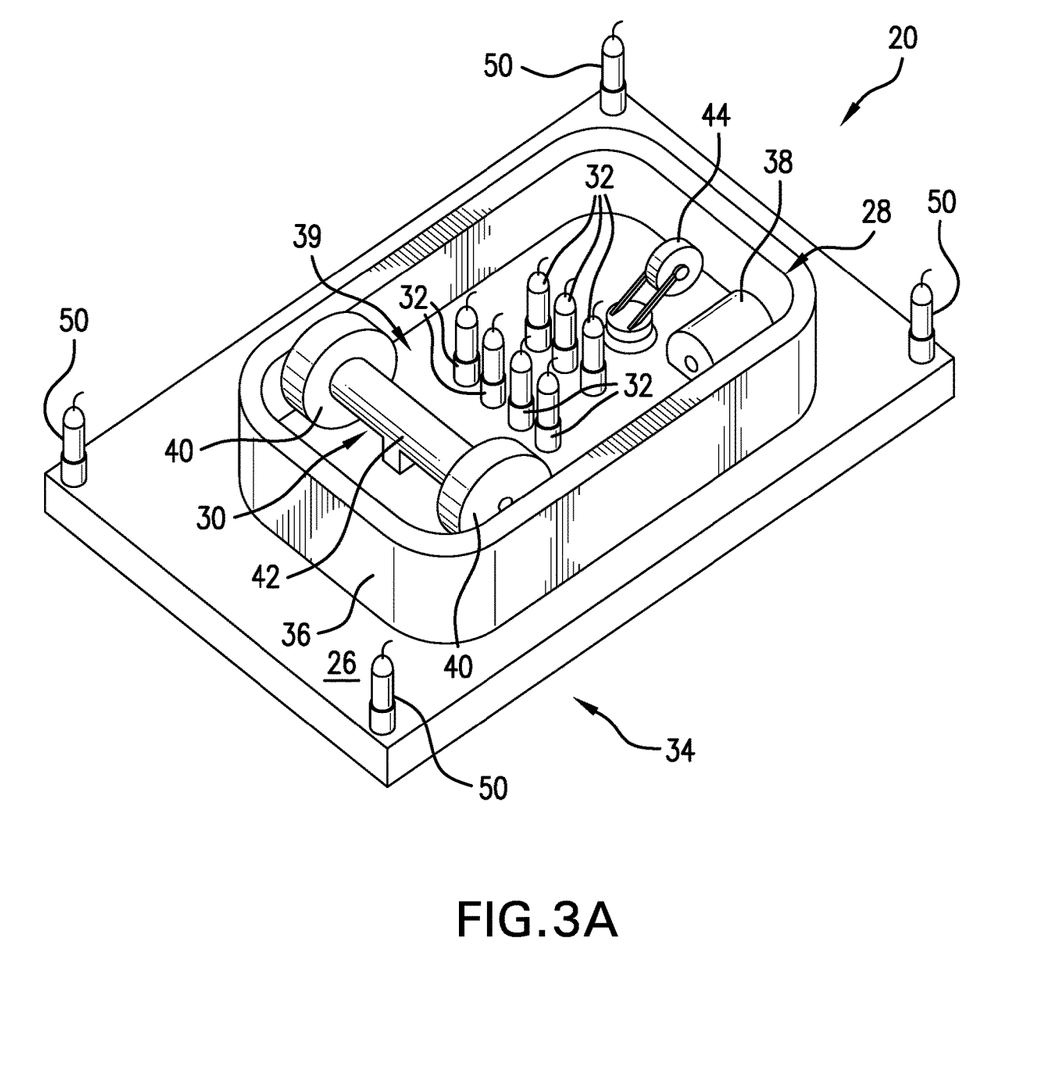
FIGS. 3A and 3B are a perspective view and a block diagram, respectively, of an embodiment of an autonomous device configured to inspect the surface topology of an airfoil of a gas turning engine.
Figure 3B:
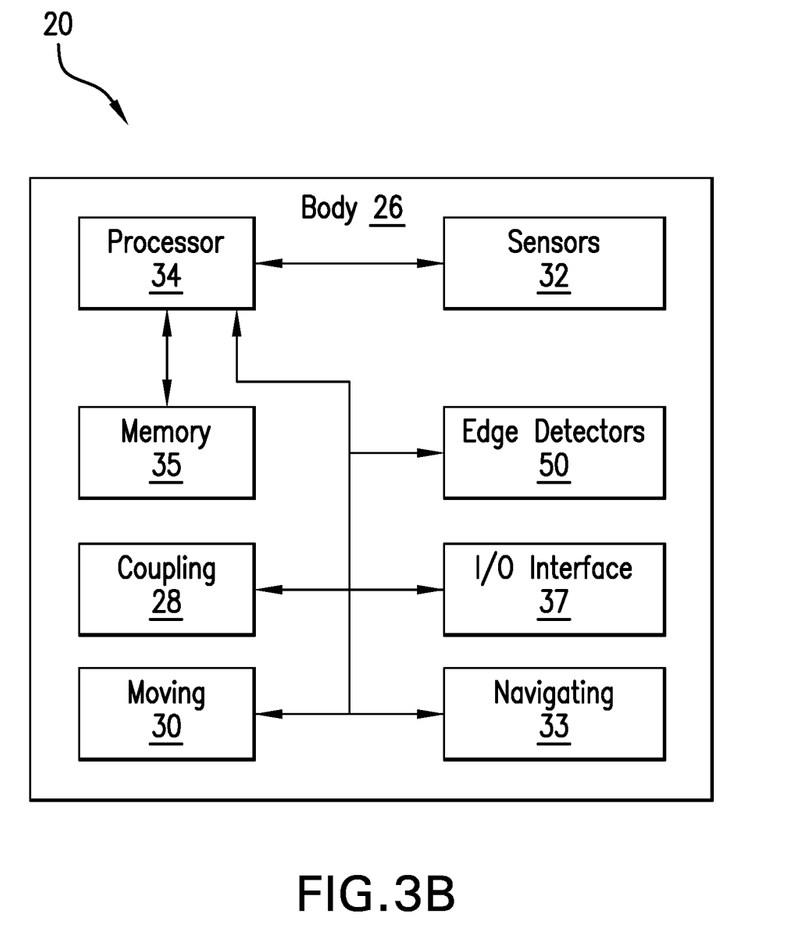

FIGS. 3A and 3B are a perspective view and a block diagram, respectively, of an embodiment of an autonomous device configured to inspect the surface topology of an airfoil of a gas turning engine. In FIG. 3A, autonomous device 20 is depicted from an underside (i.e., a side that will face and engage a surface of an airfoil). Autonomous device 20 includes body or base 26, means 28 for coupling the body to an airfoil in a manner that permits movement of body 26 across an airfoil, such as airfoil 18 depicted in FIGS. 1 and 2, while remaining coupled thereto. Autonomous device 20 also includes means 30 for moving body 26 across airfoil 18 while remaining coupled thereto. Autonomous device 20 also includes a plurality of topological sensors 32 extending from body 26 to airfoil 18 when body 26 is coupled thereto. Autonomous device 20 also includes a surface topology calculator 34 (on a topside or bottom side of autonomous device 20). In the depicted embodiment, body 26 is a substantially planar base to which the various components 28, 30, 32 and 34 are all connected.

In the depicted embodiment, means 28 for coupling body 26 to airfoil 18 includes sealing element 36 and a vacuum pump 38. Sealing element 36 circumscribes evacuation chamber 39. Sealing element 36 is configured to engage the surface of the airfoil so as to facilitate evacuation of evacuation chamber 39. Vacuum pump 38 is configured to evacuate evacuation chamber 39, thereby causing the autonomous device to adhere to the surface of an airfoil. Sealing element 36 is also configured to slidably move across the airfoil while maintaining vacuum in evacuation chamber 38 so as to adhere autonomous device 20 to the airfoil during movements thereacross. Although two suction elements 36 are depicted in the FIG. 3A embodiment, a single evacuation chamber 39 provides means 28 for coupling body 26 to a surface of airfoil 18, two or more such evacuation chambers can be used for such function. For example, in some embodiments, a two or more distinct suction elements 36 can be located on base 18 so as to provide means 28 for coupling base 26 to airfoil 18.

Various other means 28 for coupling body 26 to airfoil 18 can include a clip or a band that contacts both body 26 and a backside surface of airfoil 18, thereby providing a coupling force therebetween. In other embodiments, means 28 for coupling body 26 to airfoil 18 can include contacting members that use a surface force, and/or adhesion to provide coupling between body 26 and airfoil 18. For example, autonomous device 20 can have such adhering contacting surfaces at ends of legs 22 of autonomous device 20 of the embodiment depicted in FIG. 1. In such embodiments, contacting coating surfaces can be of a material or have coating that is tacky when in contact with surfaces 24 of airfoils 18. In another embodiment, contacting surfaces can provide a van der Waals attractive force with the surface of airfoils 18.

In the depicted embodiment, means 30 for moving autonomous device 20 across airfoil 18 include wheels 40 and motor 42. Wheels 40 extend from body 26 so as to engage the airfoil when body 26 is coupled thereto. Motor 42 is configured to rotate wheels 40, thereby moving the body across the airfoil when coupled thereto. In the depicted embodiment, means 32 for steering autonomous device 20 as it moves across the airfoil include steering wheel 44 and steering mechanism 46. A navigation computer can be configured to control means 32 for steering autonomous device 20 and means 30 for moving autonomous device 20 across airfoil 18 so as to inspect and/or map surface topology of a plurality of portions of airfoil 18. Various sensors, such as edge detectors 50 can be used to provide location information to navigation computer so as to facilitate navigation of autonomous device 20 across airfoil 18 to which it is coupled. In some embodiments, the navigation computer can include or share with topology calculator 34 a processor programmed for performing such operation(s).

Autonomous device 20 can have various other means for moving autonomous device 20 across airfoil 18. For example, autonomous device 20 can include articulated legs, as depicted in the FIG. 1 embodiment. In other embodiments, autonomous device 20 can have wheels as depicted in the FIG. 3A embodiment. Various other arrangements of wheels and/or legs can be used to move autonomous device 20 across airfoil 18. In other embodiments, means for moving autonomous device 20 across airfoil 18 can include a soft deformable robot body system.

Autonomous device 20 also includes surface topology calculator 34, which is attached to body 26 and electrically connected to the plurality of topological sensors 32. Surface topology calculator 34 is configured to determine a surface topology of airfoil 18 based on the electrical signals generated by the plurality of topological sensors 32. Surface topology calculator 34 determines the surface topology of airfoil 18 along each of a plurality of paths across airfoil 18 taken by the plurality of topological sensors 32.

Surface topology calculator 34 can be configured to execute software, applications, and/or programs stored in computer-readable memory 35. Examples of surface topology calculator 34 can include one or more of a processor, a microprocessor, a controller, a digital signal processor (DSP), an application specific integrated circuit (ASIC), a field-programmable gate array (FPGA), a video processor, or other equivalent discrete or integrated logic circuitry. In some embodiments, surface topology calculator 34 can include more than one processing core.

Computer-readable memory 35 is configured to store information and, in some examples, can be described as a computer-readable storage medium. In some examples, a computer-readable memory 35 can include a non-transitory medium. The term "non-transitory" indicates that the storage medium is not embodied in a carrier wave or a propagated signal. In certain examples, a non-transitory storage medium can store data that can, over time, change (e.g., in RAM or cache). In some examples, computer-readable memory 35 can include a temporary memory. As used herein, a temporary memory refers to a memory having a primary purpose that is not long-term storage. Computer-readable memory 35, in some examples, can include volatile memory. As used herein, a volatile memory refers to a memory that does not maintain stored contents when power to the computer-readable memory 35 is turned off. Examples of volatile memories can include random-access memories (RAM), dynamic random-access memories (DRAM), static random-access memories (SRAM), and other forms of volatile memories. In some examples, computer-readable memory 35 is used to store program instructions for execution by surface topology calculator 34. Computer-readable memory 35, in one example, is used by software or applications running on autonomous device 20 to temporarily store information during program execution.

Computer-readable memory 35, in some examples, also includes one or more computer-readable storage media. The memory can be configured to store larger amounts of information than volatile memory. The memory can further be configured for long-term storage of information. In some examples, the memory includes non-volatile storage elements. Examples of such non-volatile storage elements can include, for example, magnetic hard discs, optical discs, floppy discs, flash memories, or forms of electrically programmable memories (EPROM) or electrically erasable and programmable (EEPROM) memories.

Input/output interface 37 is an input and/or output device and enables autonomous device 20 to receive data from an external source or operator and/or to report the results of inspecting airfoil 18 by autonomous device 20. For example, input/output interface 37 can be configured to receive inputs (e.g., configuration data) from an operator and/or provide outputs related to surface topology of airfoil 18. Input/output interface 37 can include one or more of a sound card, a video graphics card, a speaker, a display device (such as a liquid crystal display (LCD), a light emitting diode (LED) display, an organic light emitting diode (OLED) display, etc.), a touchscreen, a keyboard, a mouse, a joystick, or other classification of device for facilitating input and/or output of information in a form understandable to users and/or machines. In some embodiments, input/output interface 37 is a network interface. For example, input/output interface 37 can include a network interface card, such as an Ethernet card, an optical transceiver, a radio frequency transceiver, or any other type of device that can send and receive information. Other examples of such network interfaces can include Bluetooth, 3G, 4G, and Wi-Fi radio computing devices as well as Universal Serial Bus (USB). In other embodiments, input/output interface 37 can be a custom network interface.

Topological sensor 32 can be operated in two ways: as a static device and as a dynamic device. In static operation, the topological sensor 32 generates a signal indicative corresponding to a relationship between the strain and the charge on the piezoelectric crystal of piezoelectric sensor 52, known as the strain-charge coupling equation. As the surface topology of the airfoil changes (e.g., going over a crack), strain is induced to a part of piezoelectric sensor 52 that is mechanically coupled thereto. This change in the strain on piezoelectric sensor 52 is translated into a change in the electrical properties of the piezoelectric crystal and thus produces a signal indicative thereof. In the dynamic configuration, the piezoelectric sensor is configured to superimpose, to piezoelectric sensor 52, a sinusoidal loading (i.e., a dynamic loading) to the loading provided by airfoil contacting member 52.

Figure 4:
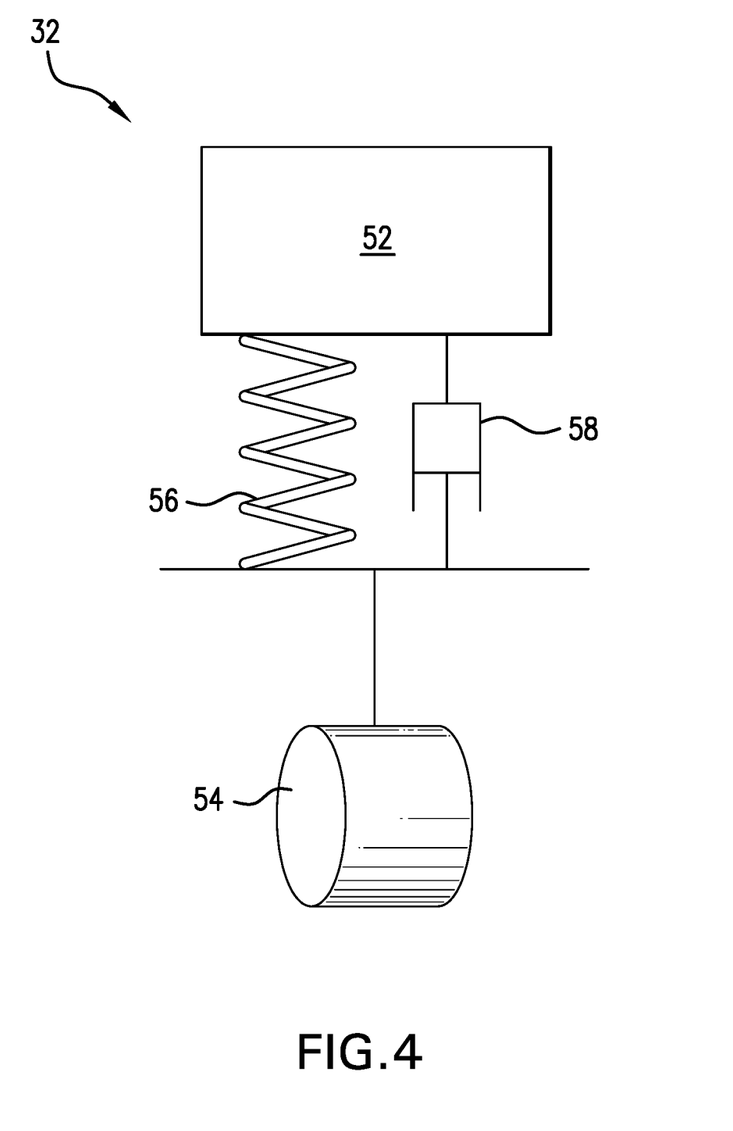
FIG. 4 is a schematic diagram of an embodiment of a topological sensor, which is configured for static operation, used to sense a surface topology of an airfoil.

FIG. 4 is a schematic diagram of an embodiment of a topological sensor, which is configured for static operation, used to sense a surface topology of an airfoil. In FIG. 4, topological sensors 32 includes piezoelectric sensor 52, airfoil contacting member 54, spring member 56, and damping member 58 (or shock absorbing member). Piezoelectric sensor 52 is configured to generate an electrical signal indicative of a loading to the piezoelectric sensor 52. Airfoil contacting member 54 extends between the piezoelectric sensor and the airfoil when body 26 of autonomous device 20 is coupled thereto, thereby providing changes to the loading to piezoelectric sensor 52 in response to changes in the surface topology of the airfoil as the body moves thereacross. In the depicted embodiment, airfoil contacting member 54 includes a wheel configured to ride upon surface 22 of airfoil 18. In some embodiments, such a wheel is castered (e.g., having a caster) so as to rotate in response to direction of travel. In other embodiments, non-rotating airfoil contacting members can be used, such as for example, a wire-like member, or a leaf-like member, a pointed tip, etc.

Spring member 56 and damping member 58 together form a linkage assembly that provides mechanical coupling of topological sensor 32 to airfoil 18. Spring member 56 is configured to determine changes in loading to piezoelectric sensor 52 that result from changes in surface topology as sensed by airfoil contacting member 54. Damping member 58 is configured to damping oscillations arising from changing surface topology. As the surface topology of the airfoil forces cause surface contacting member 54 to compress spring member 56, loading to piezoelectric sensor 52 is increased. Piezoelectric sensor 52 then generates a signal indicative of such increased loading thereto. As the surface topology of the airfoil forces cause surface contacting member 54 to compress spring member 56, loading to piezoelectric sensor 52 is increased. Piezoelectric sensor 52 then generates a signal indicative of such increased loading thereto.

Figure 5:
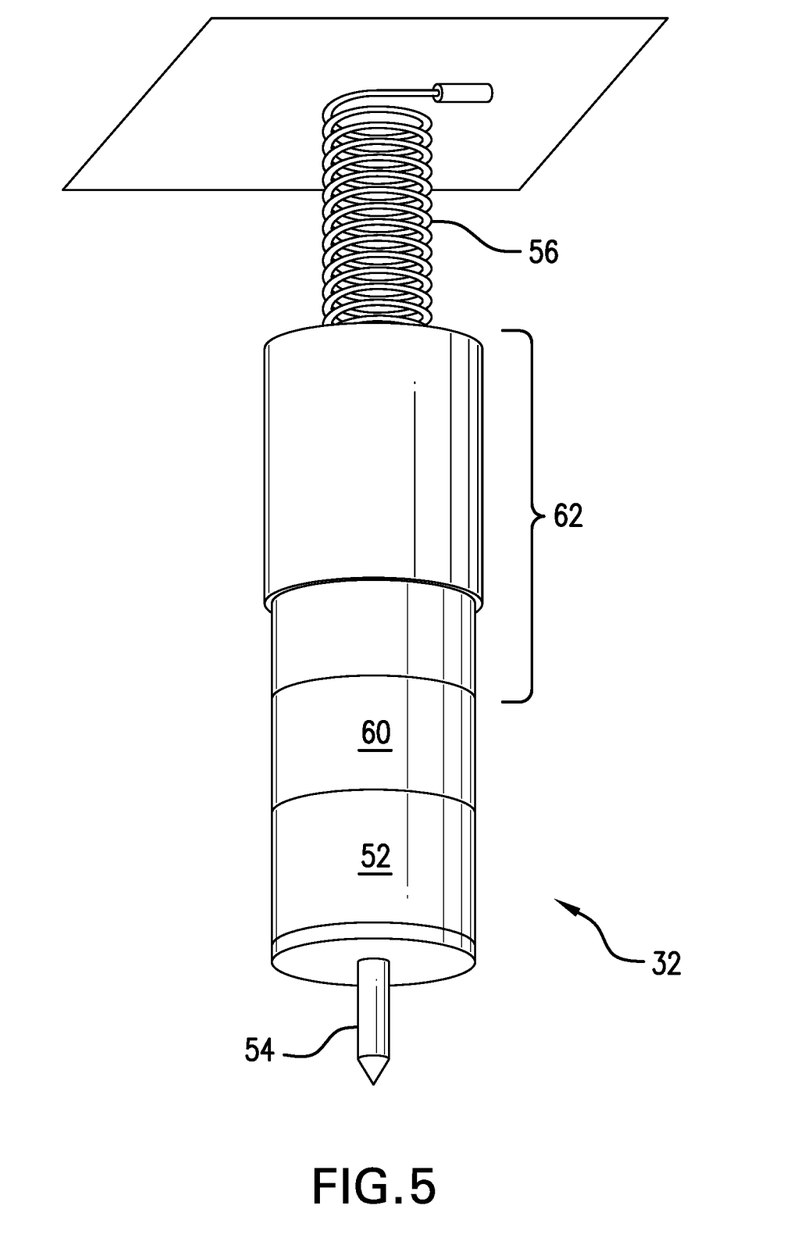
FIG. 5 is a schematic diagram of an embodiment of a topological sensor, which is configured for dynamic operation, used to sense surface topology of an airfoil.

FIG. 5 is a schematic diagram of an embodiment of a topological sensor, which is configured for dynamic operation, used to sense a surface topology of an airfoil. In FIG. 5, topological sensor 32 includes piezoelectric sensor 52, airfoil contacting member 54, spring member 56, electrical insulator 60 and piezoelectric actuator 62. As in the FIG. 4 embodiment, piezoelectric sensor 52 is configured to generate an electrical signal indicative of a loading to the piezoelectric sensor 52. Airfoil contacting member 54 extends between the piezoelectric sensor and the airfoil when body 26 of the autonomous device 20 is coupled thereto, thereby providing changes to the loading to piezoelectric sensor 52 in response to changes in the surface topology of the airfoil as body 26 moves thereacross. Spring member 56 is configured to determine changes in loading to piezoelectric sensor 52 that result from changes in surface topology as sensed by airfoil contacting member 54. As the surface topology of the airfoil forces cause airfoil contacting member 54 to compress spring member 56, loading to piezoelectric sensor 52 is increased. And as the surface topology of the airfoil forces cause surface contacting member 54 to compress spring member 56, loading to piezoelectric sensor 52 is increased.

In the FIG. 5 embodiment, topological sensor 32 can be operated in two ways: as a static device and as a dynamic device. In static operation, the signal is provided by a relationship between the strain and the charge on the piezoelectric crystal, known as the strain-charge coupling equation. As the part of piezoelectric sensor 52 that is in contact with the surface changes topology (e.g., going over a crack), the change in the strain on the sensor is translated into change in the electrical properties of the piezoelectric crystal and thus produce a signal. In the dynamic configuration, the piezoelectric sensor is configured to superimpose, to piezoelectric sensor 52, a sinusoidal loading to the loading provided by airfoil contacting member 52. To do so, piezoelectric actuator receives a sinusoidal electrical signal and generates a sinusoidal displacement in response to the received sinusoidal electrical signal. This is typically activated at the resonance of the piezoelectric crystal (i.e., where it has a minimum impedance) for maximum sensitivity. The sinusoidal displacement is superimposed upon and displacement of airfoil contacting member 52 caused by changes in the surface topology of the airfoil as autonomous device 20 moves thereacross. Because topological sensor 32 has two stacked piezoelectric crystals—piezoelectric sensor 52 and piezoelectric actuator 62—and only one is forced to vibrate (i.e., piezoelectric actuator 62), the electric signal generated by the passive piezoelectric sensor 52 is indicative of both loadings—that induced by piezoelectric actuator 62, which is modified by the spring mass system. For example, the electrical signal forcing the piezoelectric sensor 52 can be compared with the electrical signal provided to piezoelectric actuator 62. Differences between these two electrical signals are indicative of the loading provide to piezoelectric sensor 52 by airfoil contacting member 54. In various embodiments, various metrics of such deviations can be used to indicate the surface topology of the airfoil. For example, differences in the amplitudes, phases, and/or frequency spectra of these electrical signals can be indicative of the surface topology of the airfoil.

Figure 6:
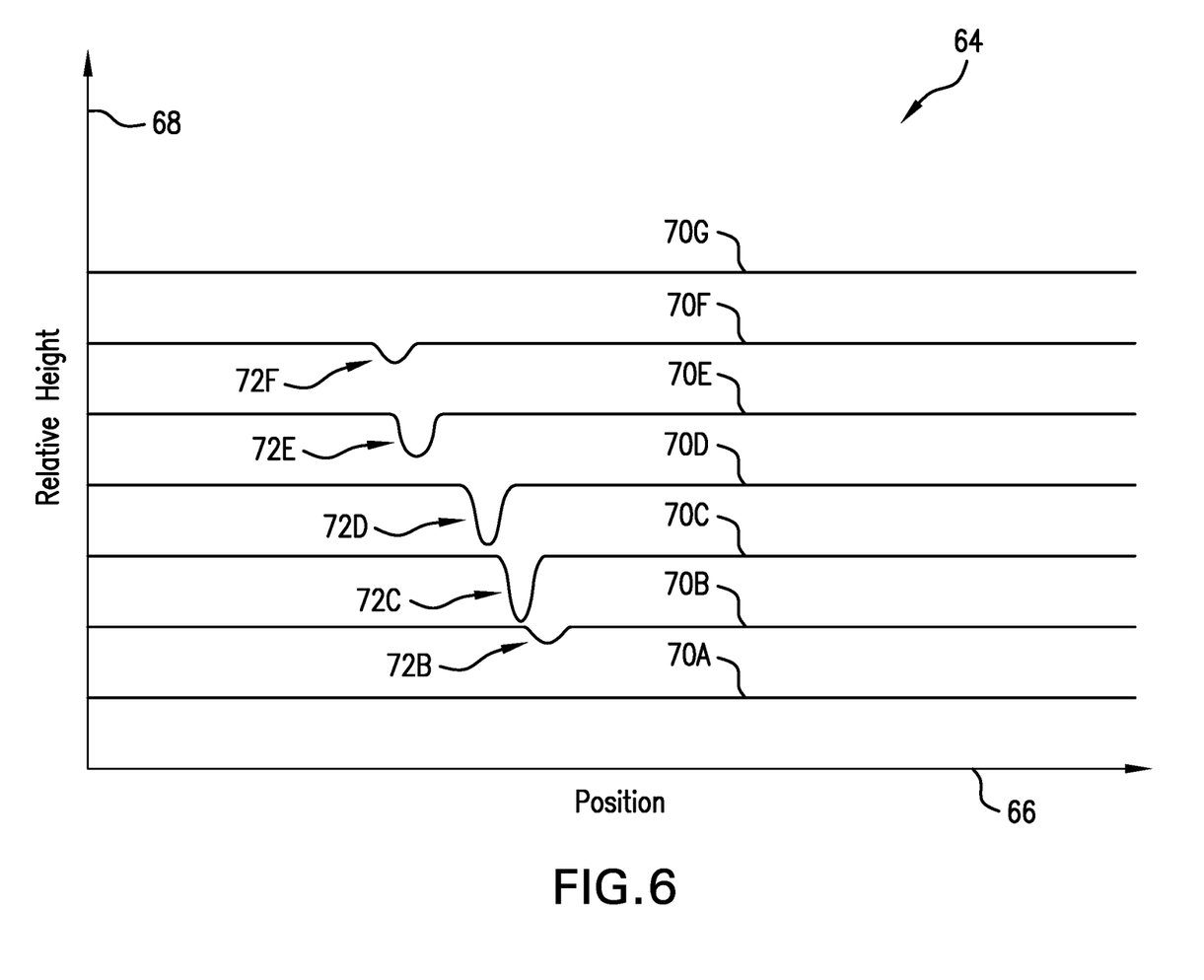
FIG. 6 is a graphical example of topology data of an airfoil that is obtained by a single robot.

FIG. 6 is an example of topology data of an airfoil that is obtained by a single robot. In FIG. 6, graph 64 includes horizontal axis 66, vertical axis 68, and topology-position relations 70A-70G. Horizontal axis 66 is indicative of the span-wise location, and vertical axis 68 is indicative of relative height (i.e., the chord-wise direction) of the airfoil. Topology-position relations 70A-70G are measurement data produced by five topological sensors 30' as autonomous device 52 moves across an airfoil. Each of topology-position relations 70A-70G are indicative of the surface topology as measured along a path across the airfoil taken by the corresponding one of topological sensors 30'. Note, that each of topology-position relations 70G-70F have a feature 72B-72F indicative of a defect in the airfoil.

Discussion of Possible Embodiments

The following are non-exclusive descriptions of possible embodiments of the present invention.

Some embodiments relate to an autonomous device for inspecting surface topology of an airfoil of a gas turbine engine. The autonomous device includes a body, means for coupling the body to the airfoil in a manner that permits movement of the body across the airfoil while remaining coupled thereto, and means for moving the body across the airfoil while remaining coupled thereto. The autonomous device also includes a plurality of topological sensors extending from the body to the airfoil when the body is coupled thereto. Each of the plurality of topological sensors includes a piezoelectric sensor that generates an electrical signal indicative of a loading to the piezoelectric sensor. Each of the plurality of topological sensors also includes an airfoil contacting member extending between the piezoelectric sensor and the airfoil when the body is coupled thereto, thereby providing changes to the loading to the piezoelectric sensor in response to changes in the surface topology of the airfoil as the body moves thereacross. The autonomous device also includes a surface topology calculator attached to the body and electrically connected to the plurality of piezoelectric sensors and configured to locate defects in the surface topology of the airfoil based on the electrical signals generated by the plurality of piezoelectric sensors.

The system of the preceding paragraph can optionally include, additionally and/or alternatively, any one or more of the following features, configurations and/or additional components:

A further embodiment of the foregoing system, wherein the surface topology calculator can determine the surface topology of the airfoil along each of a plurality of paths across the airfoil taken by the plurality of topological sensors.

A further embodiment of any of the foregoing systems, wherein the means for coupling the body to the airfoil can include a device coupling member that couples the body to the airfoil using van der Waals force.

A further embodiment of any of the foregoing systems, wherein the means for coupling the body to the airfoil can include: a sealing element circumscribing an evacuation chamber, the sealing element configured to engage the surface of the airfoil; and a vacuum pump configured to evacuate the evacuation chamber, thereby causing the autonomous device to adhere to the surface of the airfoil.

A further embodiment of any of the foregoing systems, wherein the means for moving the body across the airfoil can include: a wheel extending from the body so as to engage the airfoil when the body is coupled thereto; and a motor configured to rotate the wheel, thereby moving the body across the airfoil when coupled thereto.

A further embodiment of any of the foregoing systems, wherein the means for moving the body across the airfoil can include an arm or leg that sequentially positions itself so as to engage the airfoil and pushes or pulls the body across the airfoil when coupled thereto.

A further embodiment of any of the foregoing systems, can further include means for steering the body as it moves across the airfoil.

A further embodiment of any of the foregoing systems, can further include edge sensors that sense the edge of the airfoil.

A further embodiment of any of the foregoing systems, can further include a navigation computer configured to control the means for steering the body and the means for moving the body across the airfoil so as to map surface topology of a plurality of portions of the airfoil.

A further embodiment of any of the foregoing systems, wherein the navigation computer can be configured to cause the body to move across the airfoil in a serpentine fashion.

A further embodiment of any of the foregoing systems, wherein each of the plurality of topological sensors can further include a linkage assembly mechanically coupling the airfoil contacting member to the piezoelectric sensor. The linkage assembly can have: a spring member; and a damping member.

A further embodiment of any of the foregoing systems, wherein each of the plurality of airfoil contacting members can have a pointed tip configured to contact the airfoil.

A further embodiment of any of the foregoing systems, wherein each of the contact arms can have a wheel configured to contact the airfoil, the wheel coupled to the contact arm via a castor.

A further embodiment of any of the foregoing systems, wherein each of the plurality of topological sensors can include a piezoelectric actuator configured to superimpose, to the piezoelectric sensor, a sinusoidal loading to the loading provided by the airfoil contacting member.

Some embodiments relate to a method for inspecting surface topology of an airfoil of a gas turbine engine. The method includes adhering a base of an autonomous device to the airfoil in a manner that permits movement of the body across the airfoil while remaining coupled thereto. The method continues by moving the base of the autonomous device across the airfoil while remaining coupled thereto. The method includes extending a plurality of topological sensors from the body to the airfoil when the body is coupled thereto. For each of the plurality of topological sensors, the method includes providing changes to a loading to a piezoelectric sensor in response to changes in the surface topology of the airfoil as the body moves thereacross. For each of the plurality of topological sensors, the method also includes generating, via the piezoelectric sensor, an electrical signal indicative of a loading to the piezoelectric sensor. The method includes locating, via a surface topology calculator, defects in the surface topology of the airfoil based on the electrical signals generated by the plurality of piezoelectric sensors.

The method of the preceding paragraph can optionally include, additionally and/or alternatively, any one or more of the following features, configurations and/or additional components:

A further embodiment of the foregoing method can further include superimposing, via a piezoelectric actuator and to the piezoelectric sensor, a sinusoidal loading upon the loading provided by the airfoil contacting member.

A further embodiment of any of the foregoing methods can further include determining for each of the plurality of topological sensors, via the surface topology calculator, the surface topology of the airfoil along the path traversed thereby, based on the resonant frequency of topological sensor.

A further embodiment of any of the foregoing methods, wherein coupling the body to the airfoil can include: circumscribing an evacuation chamber via a sealing element circumscribing, the sealing element configured to engage the surface of the airfoil; and evacuating the evacuation chamber via a vacuum pump, thereby causing the autonomous device to adhere to the surface of the airfoil.

A further embodiment of any of the foregoing methods, wherein moving the body across the airfoil can include: engaging, via a wheel extending from the body, the airfoil when the body is coupled thereto; and rotating the wheel via a motor, thereby moving the body across the airfoil when coupled thereto.

A further embodiment of any of the foregoing methods, wherein moving the body across the airfoil can include sequentially positioning an arm or leg so as to engage the airfoil, thereby pushing or pulling the body across the airfoil when coupled thereto.

The invention disclosed herein is not limited to the implementations described but can be practiced with modification and alteration without departing from the scope of the appended claims. Although other embodiments may include not only the specific combinations of features disclosed above but may also include undertaking only a subset of such features, undertaking a different order of such features, undertaking a different combination of such features, and/or undertaking additional features than those features explicitly listed. The scope of the invention should, therefore, be determined with reference to the appended claims, along with the full scope of equivalents to which such claims are entitled.

The invention claimed is:

1. An autonomous device for inspecting surface topology of an airfoil of a gas turbine engine, the autonomous device comprising:
    a body;
    means for coupling the body to the airfoil in a manner that permits movement of the body across the airfoil while remaining coupled thereto;
    means for moving the body across the airfoil while remaining coupled thereto;
    a plurality of topological sensors extending from the body to the airfoil when the body is coupled thereto, each of the plurality of topological sensors including:
        a piezoelectric sensor that generates an electrical signal indicative of a loading to the piezoelectric sensor;
        an airfoil contacting member extending between the piezoelectric sensor and the airfoil when the body is coupled thereto, thereby providing changes to the loading to the piezoelectric sensor in response to changes in the surface topology of the airfoil as the body moves thereacross; and
    a surface topology calculator attached to the body and electrically connected to the plurality of piezoelectric sensors and configured to locate defects in the surface topology of the airfoil based on the electrical signals generated by the plurality of piezoelectric sensors.

2. The autonomous device of claim 1, wherein the surface topology calculator determines the surface topology of the airfoil along each of a plurality of paths across the airfoil taken by the plurality of topological sensors.

3. The autonomous device of claim 1, wherein the means for coupling the body to the airfoil includes:
    a device coupling member that couples the body to the airfoil using van der Waals force.

4. The autonomous device of claim 1, wherein the means for coupling the body to the airfoil includes:
    a sealing element circumscribing an evacuation chamber, the sealing element configured to engage the surface of the airfoil; and
    a vacuum pump configured to evacuate the evacuation chamber, thereby causing the autonomous device to adhere to the surface of the airfoil.

5. The autonomous device of claim 1, wherein the means for moving the body across the airfoil includes:
    a wheel extending from the body so as to engage the airfoil when the body is coupled thereto; and
    a motor configured to rotate the wheel, thereby moving the body across the airfoil when coupled thereto.

6. The autonomous device of claim 1, wherein the means for moving the body across the airfoil includes:
    an arm or leg that sequentially positions itself so as to engage the airfoil and pushes or pulls the body across the airfoil when coupled thereto.

7. The autonomous device of claim 1, further comprising:
    means for steering the body as it moves across the airfoil.

8. The autonomous device of claim 7, further comprising:
    edge sensors that sense the edge of the airfoil.

9. The autonomous device of claim 8, further comprising:
    a navigation computer configured to control the means for steering the body and the means for moving the body across the airfoil so as to map surface topology of a plurality of portions of the airfoil.

10. The autonomous device of claim 9, wherein the navigation computer is configured to cause the body to move across the airfoil in a serpentine fashion.

11. The autonomous device of claim 1, wherein each of the plurality of topological sensors further includes:
    a linkage assembly mechanically coupling the airfoil contacting member to the piezoelectric sensor, the linkage assembly having:
        a spring member; and
        a damping member.

12. The autonomous device of claim 1, wherein each of the plurality of airfoil contacting members has a pointed tip configured to contact the airfoil.

13. The autonomous device of claim 1, wherein each of the contact arms has a wheel configured to contact the airfoil, the wheel coupled to the contact arm via a castor.

14. The autonomous device of claim 1, wherein each of the plurality of topological sensors includes:
    a piezoelectric actuator configured to superimpose, to the piezoelectric sensor, a sinusoidal loading to the loading provided by the airfoil contacting member.

15. A method for inspecting surface topology of an airfoil of a gas turbine engine, the method comprising:
    adhering a body of an autonomous device to the airfoil in a manner that permits movement of the body across the airfoil while remaining coupled thereto;
    moving the body of the autonomous device across the airfoil while remaining coupled thereto;
    extending a plurality of topological sensors from the body to the airfoil when the body is coupled thereto, each of the plurality of topological sensors:
        providing changes to a loading to a piezoelectric sensor in response to changes in the surface topology of the airfoil as the body moves thereacross; and
        generating, via the piezoelectric sensor, an electrical signal indicative of a loading to the piezoelectric sensor; and
    locating, via a surface topology calculator, defects in the surface topology of the airfoil based on the electrical signals generated by the plurality of piezoelectric sensors.

16. The method of claim 15, further comprising:
    superimposing, via a piezoelectric actuator and to the piezoelectric sensor, a sinusoidal loading upon the loading provided by the airfoil contacting member.

17. The method of claim 15, further comprising:
    determining for each of the plurality of topological sensors, via the surface topology calculator, the surface topology of the airfoil along the path traversed thereby, based on the resonant frequency of topological sensor.

18. The method of claim 15, wherein the coupling the body to the airfoil includes:
   circumscribing an evacuation chamber via a sealing element circumscribing, the sealing element configured to engage the surface of the airfoil; and
   evacuating the evacuation chamber via a vacuum pump, thereby causing the autonomous device to adhere to the surface of the airfoil.

19. The method of claim 15, wherein moving the body across the airfoil includes:
   engaging, via a wheel extending from the body, the airfoil when the body is coupled thereto; and
   rotating the wheel via a motor, thereby moving the body across the airfoil when coupled thereto.

20. The method of claim 15, wherein the moving the body across the airfoil includes:
   sequentially positioning an arm or leg so as to engage the airfoil, thereby pushing or pulling the body across the airfoil when coupled thereto.

\* \* \* \* \*